United States Patent
Hayashi

(10) Patent No.: US 9,030,643 B2
(45) Date of Patent: May 12, 2015

(54) LIQUID CRYSTAL OPTICAL ELEMENT AND IMAGE DISPLAY APPARATUS INCLUDING THE SAME

(71) Applicant: Panasonic Corporation, Osaka (JP)

(72) Inventor: Katsuhiko Hayashi, Nara (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 149 days.

(21) Appl. No.: 13/869,636

(22) Filed: Apr. 24, 2013

(65) Prior Publication Data

US 2013/0286344 A1    Oct. 31, 2013

(30) Foreign Application Priority Data

Apr. 26, 2012   (JP) .................................. 2012-101111
Apr. 5, 2013    (JP) .................................. 2013-079587

(51) Int. Cl.
   *G02F 1/13*     (2006.01)
   *G02F 1/1335*   (2006.01)
   *G02F 1/29*     (2006.01)
   *G02B 27/22*    (2006.01)
   *F21V 8/00*     (2006.01)

(52) U.S. Cl.
   CPC ............ *G02F 1/1313* (2013.01); *G02F 1/1336* (2013.01); *G02F 1/29* (2013.01); *G02B 27/2214* (2013.01); *G02F 2001/133626* (2013.01); *G02B 6/0038* (2013.01); *G02B 6/0053* (2013.01); *G02B 6/0068* (2013.01)

(58) Field of Classification Search
   CPC ............... G11B 7/1374; G11B 7/1353; G11B 2007/0006; G02B 5/04; G02B 5/05; G02B 6/0036; G02B 27/0972

USPC ................. 349/15, 193, 57; 359/438, 485.06, 359/489.09; 353/33; 362/626
See application file for complete search history.

(56) References Cited

U.S. PATENT DOCUMENTS

| 5,648,859 | A  | * | 7/1997  | Hirabayashi et al. | ............. 349/9  |
| 5,661,603 | A  | * | 8/1997  | Hanano et al.      | ............. 359/622 |
| 6,612,723 | B2 | * | 9/2003  | Futhey et al.      | ............. 362/339 |
| 7,439,938 | B2 | * | 10/2008 | Cho et al.         | ............. 345/1.3 |

(Continued)

FOREIGN PATENT DOCUMENTS

| EP | 2081059 B1   | * | 8/2012  |
| JP | 2011-134560  | * | 12/2009 |

(Continued)

*Primary Examiner* — Lucy Chien
(74) *Attorney, Agent, or Firm* — McDermott Will & Emery LLP

(57) ABSTRACT

A liquid crystal prism element includes: a first prism array; a second prism array arranged so as to face the first prism array; and a liquid crystal layer provided between the first and second prism arrays. The first prism array is composed of a plurality of first prisms that have ridge lines extending in a Y axis direction and are arranged so as to be spaced apart from each other at predetermined intervals in an X axis direction. The second prism array is composed of second prisms that have ridge lines extending in the Y axis direction and are arranged so as to be spaced apart from each other at predetermined intervals in the X axis direction. Each first prism has an inclined surface facing a center side of the liquid crystal layer. Each second prism has an inclined surface facing the center side of the liquid crystal layer.

3 Claims, 7 Drawing Sheets

(56) References Cited

U.S. PATENT DOCUMENTS

| | | | |
|---|---|---|---|
| 2005/0213001 A1* | 9/2005 | Ueki et al. | 349/113 |
| 2007/0024974 A1* | 2/2007 | Itoh et al. | 359/487 |
| 2007/0153354 A1* | 7/2007 | Duston et al. | 359/245 |
| 2009/0140962 A1* | 6/2009 | Hwang et al. | 345/87 |
| 2010/0103350 A1* | 4/2010 | Arai et al. | 349/64 |
| 2010/0157026 A1 | 6/2010 | Reichelt | |
| 2011/0069253 A1* | 3/2011 | Murao et al. | 349/62 |

FOREIGN PATENT DOCUMENTS

| | | | |
|---|---|---|---|
| JP | 2010-529485 A | | 8/2010 |
| JP | 2011-134560 A | | 7/2011 |
| WO | WO 2009-036893 | * | 3/2009 |

* cited by examiner

US 9,030,643 B2

LIQUID CRYSTAL OPTICAL ELEMENT AND IMAGE DISPLAY APPARATUS INCLUDING THE SAME

CROSS REFERENCE TO RELATED APPLICATION

The disclosure of Japanese Patent Application Nos. 2012-101111, filed on Apr. 26, 2012, and 2013-079587, filed on Apr. 5, 2013, is incorporated herein by reference.

BACKGROUND

1. Field

The present disclosure relates to an image display apparatus for displaying an image, such as a liquid crystal display.

2. Description of the Related Art

Japanese Laid-Open Patent Publication No. 2010-529485 discloses an automatic stereoscopic display that causes images to be stereoscopically viewed by alternately providing light of an image for right eye and light of an image for left eye to the eyes of multiple observers, respectively. In the apparatus disclosed in Japanese Laid-Open Patent Publication No. 2010-529485, the optical refraction behavior by a deflection means is changed so as to follow the eye positions of the observers. The deflection means is composed of electrowetting cells containing two types of immiscible liquids. When a voltage is applied to the electrowetting cells, the interface between the liquids is changed, whereby a prism function is realized by the electrowetting cells.

SUMMARY

The present disclosure provides a liquid crystal prism element that allows an oriented state and a refraction angle to be changed in accordance with a voltage applied thereto and for which an optimum prism design is made.

A liquid crystal optical element that solves the above problem includes: a first prism array; a second prism array arranged so as to face the first prism array; and a liquid crystal layer provided between the first and second prism arrays. The first prism array is composed of a plurality of first prisms that have ridge lines extending in a first direction and are arranged so as to be spaced apart from each other at predetermined intervals in a second direction perpendicular to the first direction. The second prism array is composed of a plurality of second prisms that have ridge lines extending in the first direction and are arranged so as to be spaced apart from each other at predetermined intervals in the second direction. Each of the first prisms has a first inclined surface facing a center side of the liquid crystal layer. Each of the second prisms has a second inclined surface facing the center side of the liquid crystal layer.

The present disclosure is effective for forming a liquid crystal prism element that allows an oriented state and a refraction angle to be changed in accordance with a voltage applied thereto and for which an optimum prism design is made.

DETAILED DESCRIPTION

Hereinafter, embodiments will be described in detail with reference to the drawings as appropriate. However, there will be instances in which detailed description beyond what is necessary is omitted. For example, detailed description of subject matter that is previously well-known, as well as redundant description of components that are substantially the same will in some cases be omitted. This is to prevent the following description from being unnecessarily lengthy, in order to facilitate understanding by a person of ordinary skill in the art.

The inventor provides the following description and the accompanying drawings in order to allow a person of ordinary skill in the art to sufficiently understand the present disclosure, and the description and the drawings are not intended to restrict the subject matter of the scope of the patent claims.

1. Configuration of Image Display Apparatus

Figure 1:
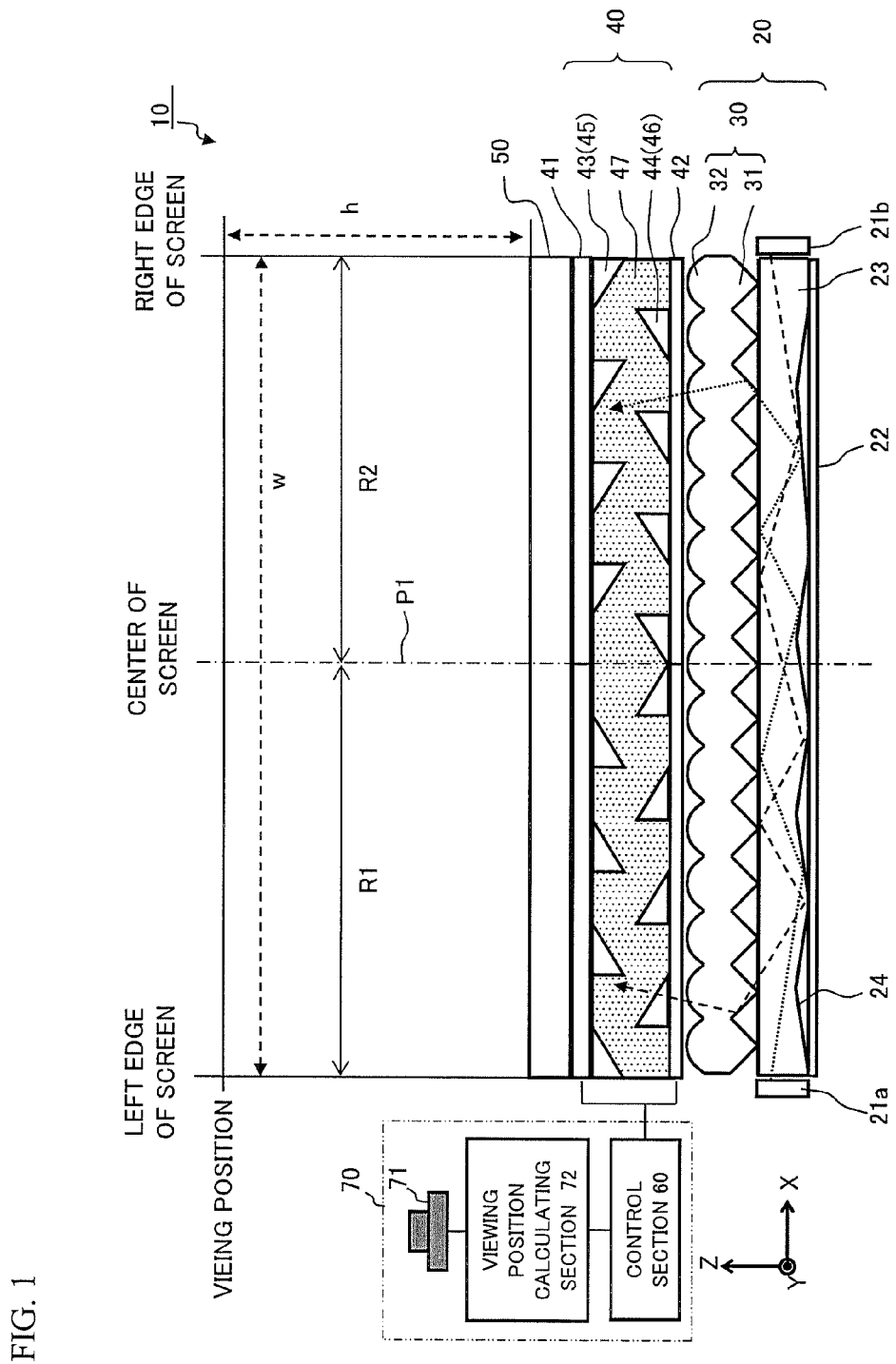
FIG. 1 is a schematic configuration diagram of an image display apparatus according to an embodiment.
Figure 2:
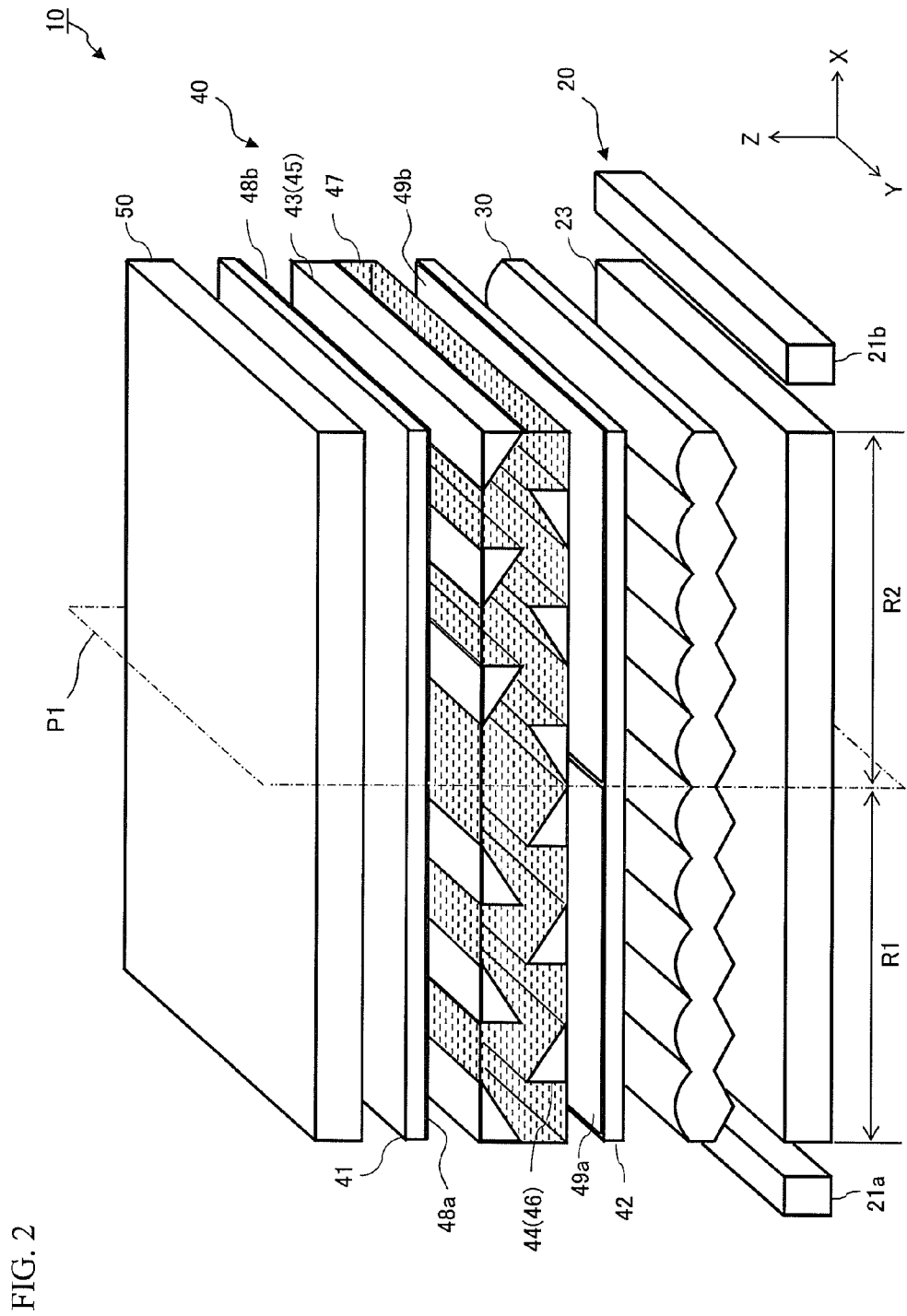
FIG. 2 is an exploded perspective view of a portion of the image display apparatus.

FIG. 1 is a schematic cross-sectional view of an image display apparatus 10 according to an embodiment, and FIG. 2 is an exploded perspective view of a portion of the image display apparatus 10 shown in FIG. 1. It is noted that in FIG. 1, illustration of electrodes 48a, 48b, 49a, and 49b shown in FIG. 2 is omitted.

In the present embodiment, a three-dimensional orthogonal coordinate system is set for the image display apparatus 10, and a direction is specified by using the coordinate axes. As shown in FIGS. 1 and 2, an X axis direction coincides with a right-left direction (horizontal direction) when a user faces a display surface of an image display panel 50. A Y axis direction coincides with an up-down direction when the user faces the display surface of the image display panel 50. A Z axis direction coincides with a direction perpendicular to the display surface of the image display panel 50. Here, "facing" means that the user is located directly in front of the display surface such that, for example, when a letter of "A" is displayed on the display surface, the user sees the letter of "A" from a correct direction. In addition, FIGS. 1 and 2 correspond to views as seen from above the image display apparatus 10. Thus, the left side in FIGS. 1 and 2 corresponds to the right side of the display screen when a viewer sees the display screen.

The image display apparatus 10 includes a light source switching type backlight 20, a liquid crystal prism element 40, the image display panel 50 which displays an image for right eye and an image for left eye while alternately switching between the image for right eye and the image for left eye, a position detection section 70 which detects the position of a user who uses the image display apparatus 10, and a control section 60 which controls a liquid crystal driving voltage outputted to the liquid crystal prism element 40, on the basis of information of the detected position of the user.

The image display apparatus 10 switches between light sources 21a and 21b in synchronization with switching between the image for right eye and the image for left eye. In addition, when the switching between the image for right eye and the image for left eye is performed at a frequency equal to or higher than 120 Hz, the user can recognize a stereoscopic image on the basis of the image for right eye and the image for left eye.

Hereinafter, each component will be described in detail.

2. Configuration of Backlight

The light source switching type backlight 20 includes the light sources 21a and 21b facing each other, a reflection film 22, a light guide plate 23, and a light control film 30. The reflection film 22 is provided on a lower surface side (back surface side) of the light guide plate 23, and the light control film 30 is provided on an upper surface side (front surface side) of the light guide plate 23.

The light sources 21a and 21b are arranged so as to extend along a pair of side surfaces, respectively, of the light guide plate 23, and face each other in the X axis direction. The light source 21a is located at the left side surface of the light guide plate 23, and the light source 21b is located at the right side surface of the light guide plate 23. Each of the light sources 21a and 21b has a plurality of LED elements arranged in the Y axis direction. Each of the light sources 21a and 21b alternately repeats lighting-up and going-out in synchronization with switching between the image for right eye and the eye image for left eye which are displayed on the image display panel 50. In other words, when the image display panel 50 displays the image for right eye, the light source 21a lights up and the light source 21b goes out, and when the image display panel 50 displays the image for left eye, the light source 21a goes out and the light source 21b lights up.

Light emitted from the light sources 21a and 21b spreads within the light guide plate 23 while being repeatedly totally reflected at the upper surface and the lower surface of the light guide plate 23. Light having an angle exceeding the total reflection angle within the light guide plate 23 is emitted from the upper surface of the light guide plate 23. The lower surface of the light guide plate 23 is composed of a plurality of inclined surfaces 24 as shown in FIGS. 1 and 2. By these inclined surfaces 24, light propagating within the light guide plate 23 is reflected in various directions, and thus the intensity of the light emitted from the light guide plate 23 becomes uniform across the entire upper surface.

The reflection film 22 is provided on the lower surface side of the light guide plate 23. Light having an angle exceeding the total reflection angles of the inclined surfaces 24 provided in the lower surface of the light guide plate 23 is reflected by the reflection film 22, enters the light guide plate 23 again, and is eventually emitted from the upper surface. The light emitted from the light guide plate 23 is incident on the light control film 30.

On a lower surface of the light control film 30, a plurality of prisms 31 each having a triangular cross section and a ridge line extending in the Y axis direction are aligned along the X axis direction. In other words, on the lower surface of the light control film 30, the prisms 31 each having a triangular cross section are arranged in a one-dimensional array. In addition, on an upper surface of the light control film 30, a plurality of cylindrical lenses 32 extending in the Y axis direction are aligned in the X axis direction. In other words, a lenticular lens is formed on the upper surface of the light control film 30.

The light incident on the lower surface of the light control film 30 is refracted toward the Z axis direction by the prisms 31, converged by the lenticular lens located on the upper surface, and is incident on the liquid crystal prism element 40.

3. Configuration of Liquid Crystal Prism Element 40

As shown in FIGS. 1 and 2, the liquid crystal prism element 40 includes a substrate 41, a substrate 42, a first prism array 45, a second prism array 46, a liquid crystal layer 47, the electrodes 48a and 48b, and the electrodes 49a and 49b.

The substrate 41 and the substrate 42 are arranged so as to face each other.

The first prism array 45 is formed on an inner surface of the substrate 41 (a surface on a side facing the substrate 42). In addition, the second prism array 46 is formed on an inner surface of the substrate 42 (a surface on a side facing the substrate 41). The first prism array 45 and the second prism array 46 are arranged so as to face each other.

The first prism array 45 is composed of a plurality of first prisms 43. Each first prism 43 has a ridge line extending in the Y axis direction. The Y axis direction is an example of a first direction. The plurality of first prisms 43 are aligned in the X axis direction. The X axis direction is an example of a second direction. A predetermined interval is provided between the first prisms 43 adjacent to each other in the X axis direction.

The second prism array 46 is composed of a plurality of second prisms 44. Each second prism 44 has a ridge line extending in the Y axis direction. The plurality of second prisms 44 are aligned in the X axis direction. A predetermined interval is provided between the second prisms 44 adjacent to each other in the X axis direction in a region outside the screen center. It is noted that in the example shown in FIGS. 1 and 2, no interval is provided between the two second prisms 44 adjacent to each other across the center line of the screen, but an interval may be provided therebetween.

Each of the first prisms 43 and the second prisms 44 has a substantially triangle-shaped cross section in an XZ plane. In the present embodiment, the cross section of each of the first prisms 43 and the second prisms 44 is a right triangle. As shown in FIG. 1, the first prisms 43 and the second prisms 44 are configured such that the oblique side of each first prism 43 (the opposite side with respect to the right angle of the right triangle) and the oblique side of each second prism 44 (the opposite side with respect to the right angle of the right triangle) are in contact with the liquid crystal layer 47 on the XZ plane.

In addition, as shown in FIG. 2, each of the first prisms 43 and the second prisms 44 is formed in a shape extending in the Y axis direction. In other words, each of the first prisms 43 and the second prisms 44 is formed in a triangular pole shape.

The electrode 48a and the electrode 48b are formed between the substrate 41 and the first prism array 45. In addition, the electrode 49a and the electrode 49b are formed between the substrate 42 and the second prism array 46.

The liquid crystal layer 47 is formed between the substrate 41 and the substrate 42. Specifically, the liquid crystal layer 47 is in contact with the electrode 48a, the electrode 48b, and the first prism array 45 on the substrate 41 side.

It is noted that although each of the first prisms 43 and the second prisms 44 is formed in a shape extending the Y axis direction in the present embodiment, each of the first prisms 43 and the second prisms 44 may be formed in a shape extending in a direction inclined at a predetermined angle with respect to the Y axis. With such a configuration, occurrence of moiré (interference fringes) can be reduced. Moiré is a striped pattern that occurs visually due to a difference between the cycles of a plurality of periodic structures when the periodic structures are combined. In the present embodiment, since a plurality of periodic structures such as an arrangement of pixels of the image display panel 50, the light control film 30 (the prisms 31 and the cylindrical lenses 32), and the liquid crystal prism element 40 (the first prism array 45 and the second prism array 46) are laminated, moiré is likely to occur. However, when each of the first prisms 43 and the second prisms 44 is formed in a shape extending in a direction inclined at a predetermined angle with respect to the Y axis, moiré can be made unlikely to occur.

Furthermore, although each electrode is formed between the substrate and the prism array in the present embodiment, each electrode may be formed on a surface opposite to the surface on which the prism array is provided. Moreover, although the prism array and the substrate are configured as separate components in the present embodiment, the prism array and the substrate may be formed so as to be integrated with each other.

The liquid crystal prism element 40 controls a deflection direction such that the light that is emitted from the left-side light source 21a and incident thereon through the light guide plate 23 and the light control film 30 is converged at the position of the right eye of the user.

In addition, the liquid crystal prism element 40 controls a deflection direction such that the light that is emitted from the right-side light source 21b and incident thereon through the light guide plate 23 and the light control film 30 is converged at the position of the left eye of the user.

As understood from FIGS. 1 and 2, a plurality of the first prisms 43 are provided on the electrodes 49a and 49b so as to be aligned in the X axis direction. Cross-sectional shapes of a plurality of the first prisms 43 are formed so as to be bilaterally symmetrical in the entire liquid crystal prism element 40. For facilitating the explanation, the region where the first prisms 43 are formed is divided into left and right halves in FIGS. 1 and 2, the left-side region is indicated by R1, and the right-side region adjacent to the region R1 in the X axis direction is indicated by R2. In addition, a plane that passes through the border line (center line) between the regions R1 and R2 and is orthogonal to the display surface of the image display panel 50 is indicated by P1. The cross-sectional shape of the first prisms 43 located in the region R1 and the cross-sectional shape of the first prisms 43 located in the region R2 are designed so as to be symmetrical to each other about the plane P1 when seen on a plane parallel to an XZ plane, as shown in FIGS. 1 and 2.

The electrode 48a is formed in the region R1 of the inner surface of the substrate 41. The electrode 48b is formed in the region R2 of the inner surface of the substrate 41. Similarly, the electrode 49a is formed in the region R1 of the inner surface of the substrate 42, and the electrode 49b is formed in the region R2 of the inner surface of the substrate 42.

Figure 3A:
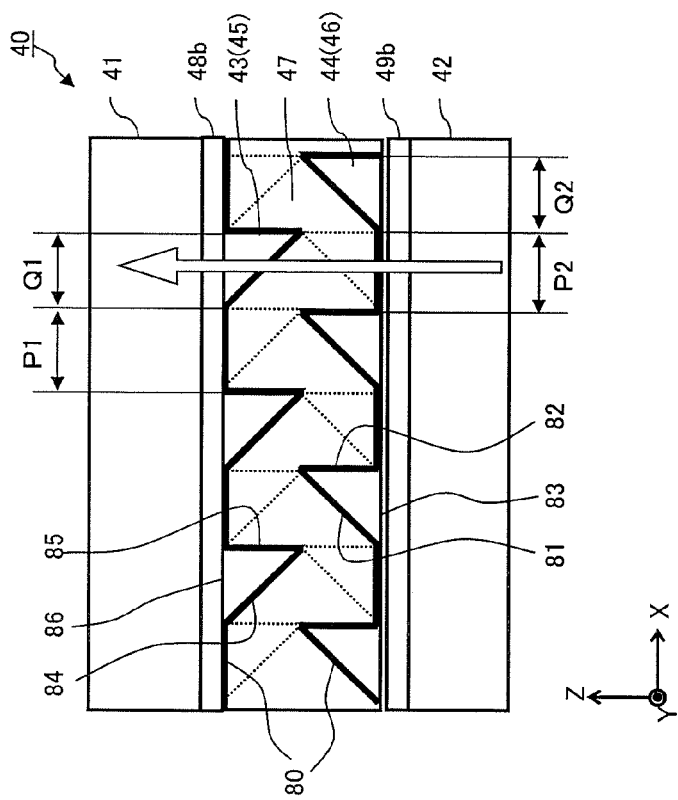
FIG. 3A is a partially enlarged view of a center side of the liquid crystal prism element.
Figure 3B:
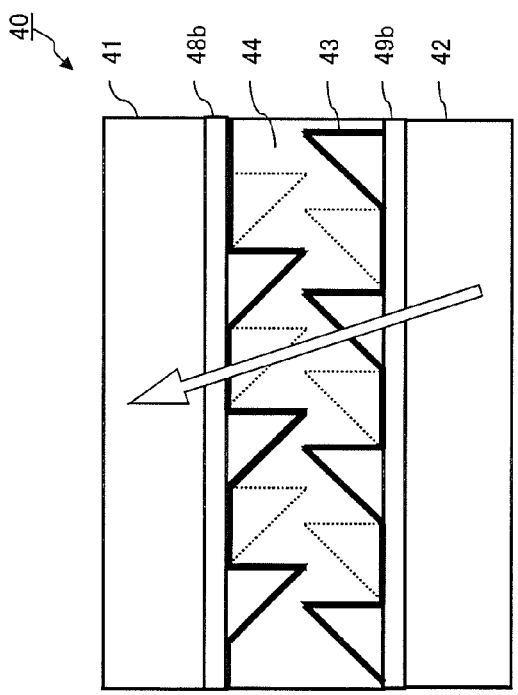
FIG. 3B is a partially enlarged view of a right edge of the liquid crystal prism element.

Furthermore, an alignment film 80 which is subjected to orientation treatment for controlling the orientation directions of liquid crystal molecules into a desired direction is provided on the surfaces of the first prisms 43 and the electrodes 48a and 48b (see FIGS. 3A and 3B). The alignment film 80 orients the liquid crystal molecules such that the long axes of the liquid crystal molecules extend in the Y axis direction in a state where no voltage is applied to the electrodes 48a and 48b and the electrodes 49a and 49b. It is noted that the alignment film 80 may be omitted as long as the orientations of the liquid crystal molecules are kept uniform.

As the materials of the substrates 41 and 42 and the first prisms 43, glass or resin can be used. When resin is used as the material of the first prisms 43, the first prisms 43 can be formed by, as an example, imprinting a UV-curing resin on a glass substrate. The liquid crystal prism element 40 can be produced by forming a one-dimensional array of the first prisms 43 on the substrate 42 on which the electrodes 49a and 49b have been formed, then attaching together the substrate 42 and the substrate 41 on which the electrodes 48a and 48b have been formed, and injecting a liquid crystal between the substrates 41 and 42.

The liquid crystal prism element 40 is an element that is able to control the magnitude of the deflection angle of transmitted light according to the magnitude of a voltage applied from the outside. The principle will be described briefly. In general, a liquid crystal molecule has an ellipsoidal shape and has different dielectric constants in the longitudinal direction and the lateral direction thereof. Thus, the liquid crystal layer 47 has a birefringence property in which a refractive index is different for each deflection direction of incident light. In addition, when the direction of the longitudinal axis orientation (director) of each liquid crystal molecule relatively changes with respect to the deflection direction of light, the refractive index of the liquid crystal layer 47 also changes. Thus, when the orientation of the liquid crystal is changed by an electric field generated by applying a certain voltage, the refractive index for transmitted light changes, and thus a deflection angle which is a refraction angle of the light changes.

In the present embodiment, a case where uniaxial positive type liquid crystal is used as the material forming the liquid crystal layer 47 will be considered. Then, a case where the longitudinal axes of the liquid crystal molecules are oriented in the Y axis direction when no voltage is applied between the substrates; and the longitudinal axes of the liquid crystal molecules are oriented in the Z axis direction when a voltage is applied between the substrates will be considered. It is noted that the liquid crystal molecules may be negative type liquid crystal.

In general, in the case where light is deflected by an active element such as the liquid crystal prism element 40, it is desirable to use a liquid crystal material having high $\Delta n$ (=refractive index ne for extraordinary light−refractive index no for ordinary light), in order to increase a deflection angle. However, among commercially available materials, the number of liquid crystal materials having high $\Delta n$ is small, and $\Delta n$ is generally about 0.2.

In addition, even when the liquid crystal prism is formed using the same liquid crystal material, design of the orientation direction and a manner of applying an electric field are important items that have a great influence on the element performance, which is the ability of the liquid crystal prism element, such as a deflection angle, electric power, a switching speed.

It is noted that in the liquid crystal prism element 40, the inclination direction of each inclined surface of each first prism 43 is different between the right and left sides of the center line of the screen (the plane P1). The liquid crystal prism element 40 has a property in which the efficiency of deflection toward a direction in which emitted light gets close to the inclined surface of each first prism 43 is low as compared to that of deflection toward a direction in which emitted light becomes more distant from the inclined surface of each first prism 43. Thus, when the inclined surfaces of the first prisms 43 are made symmetrical about the plane P1 and are also made to face ahead of the center portion of the screen, the liquid crystal prism element 40 is able to efficiently deflect light incident near the left edge of the screen, toward ahead of the screen on the right, and is able to efficiently deflect light incident near the right edge of the screen, toward ahead of the screen on the left. In this case, different voltages are applied to the right and left regions of the liquid crystal prism element 40. Thus, the electrodes 49a and 49 are separated at the screen center. Alternatively, when both electrodes in the same substrate are used as ground terminals, the electrodes may not be separated at the center.

4. Configuration of Image Display Panel

Light transmitted through the liquid crystal prism element 40 is incident on the image display panel 50. The image display panel 50 displays an image or video. The image display panel 50 is composed of, for example, a liquid crystal panel. One example of the image display panel 50 is an in-plane-switching type panel. However, another type of image display panel can be used as the image display panel 50. Light transmitted through the image display panel 50 has directivity and is converged at the position of an eye of the viewer.

5. Configuration of Control Section

The control section 60 controls the value of a voltage applied to the liquid crystal prism element 40, on the basis of the viewing position information calculated by the viewing position calculation section 72. More specifically, when the viewing position of the user shifts from a position in front of the screen center to the screen left edge side, the light emitted from each first prism 43 is deflected toward ahead of the screen on the left by making the refractive index of the liquid crystal layer 47 lower than the refractive index of each first prism 43 in the region R1 and making the refractive index of the liquid crystal layer 47 higher than the refractive index of each first prism 43 in the region R2. At that time, the deflection angle in the region R1 and the deflection angle in the region R2 can be adjusted by making the voltage applied to the region R1 higher than a voltage applied when light is not deflected and making the voltage applied to the region R2 lower than the voltage applied when light is not deflected. In contrast, when the viewing position of the user shifts from a position in front of the screen center to the right edge side, the light emitted from each first prism 43 is deflected toward ahead of the screen on the right by making the refractive index of the liquid crystal layer 47 higher than the refractive index of each first prism 43 in the region R1 and making the refractive index of the liquid crystal layer 47 lower than the refractive index of each first prism 43 in the region R2. At that time, the deflection angle in the region R1 and the deflection angle in the region R2 can be adjusted by making the voltage applied to the region R1 lower than the voltage applied when light is not deflected and making the voltage applied to the region R2 higher than the voltage applied when light is not deflected.

It is noted that the deflection angle of the liquid crystal prism element 40 and position information of a converged point of light with respect to an applied voltage can be assumed at the stage of designing, and thus it suffices to previously prepare data that associates an applied voltage with position information and to store the data in a storage unit provided in the image display apparatus 10. In addition, after completion of a product, calibration may be performed to correct the position of a light converged point.

6. Configuration of Position Detection Section

The position detection section 70 includes a camera 71 and a viewing position calculation section 72. The camera 71 takes an image of the user in predetermined cycles. The viewing position calculation section 72 analyzes the image taken by the camera 71 and calculates viewing position information representing a viewing position of the user. For image analysis performed by the camera 71, a known algorithm for recognizing the position of a face or a portion (eyes, nose, etc.) of a face can be used. In addition, the viewing position information calculated by the viewing position calculation section 72 preferably represents the positions of the eyes of the user, but may represent the position of the face, the nose, or the like instead of the positions of the eyes.

7. Configuration of Liquid Crystal Prism Element

Hereinafter, the liquid crystal prism element 40 will be described in detail with reference to FIGS. 3A and 3B. FIG. 3A is a partially enlarged view of a region on a screen center side of the liquid crystal prism element 40. FIG. 3B is a partially enlarged view of a region on a screen right edge side of the liquid crystal prism element 40. In other words, FIGS. 3A and 3B are partially enlarged views of the liquid crystal prism element 40 shown in FIG. 1. Specifically, FIGS. 3A and 3B are partially enlarged views of the region R2 on the right side of the liquid crystal prism element 40 shown in FIG. 1. In FIGS. 3A and 3B, dotted lines are auxiliary lines indicated in portions where no first prism 43 and no second prism 44 are present.

Each first prism 43 is formed in a triangular pole shape having a triangular cross section and a ridge line extending in the Y axis direction, and has two inclined surfaces, namely, an inclined surface 81 on the center side of the substrate 42 and a wall surface 82 on the lateral side of the substrate 42, and a bottom surface 83. The inclined surface 81 faces the center side of the liquid crystal layer 47. The inclined surface 81 of each first prism 43 is an example of a first inclined surface.

In addition, similarly, each second prism 44 also has an inclined surface 84, a wall surface 85, and a bottom surface 86. The inclined surface 84 of each second prism 44 faces the center side of the liquid crystal layer 47. The inclined surface 84 is an example of a second inclined surface.

The first prism array 45 is composed of a plurality of the first prisms 43 arranged so as to be spaced apart from each other at predetermined intervals P1. The widths of the first prisms 43 in the X axis direction are Q1. The intervals P1 and the widths Q1 are the same.

The intervals P1 and the widths Q1 of the first prisms 43 are the same across the entire liquid crystal prism element 40. In other words, the first prisms 43 are formed so as to have the same width Q1 near the screen center as well as at the screen right edge. In addition, the intervals P1 between the first prisms 43 are also the same near the screen center as well as at the screen right edge.

The second prism array 46 is composed of a plurality of the second prisms 44 arranged so as to be spaced apart from each other at predetermined intervals P2. The widths of the second prisms 44 in the X axis direction are Q2. The predetermined intervals P2 and the widths Q2 are the same.

The intervals P2 and the widths Q2 of the second prisms 44 are the same across the entire liquid crystal prism element 40. In other words, the second prisms 44 are formed as to have the same width Q2 near the screen center as well as at the screen right edge. In addition, the intervals P2 between the second prisms 42 are also the same near the screen center as well as at the screen right edge.

In the present embodiment, a design is made such that the interval P2 between each second prism 44 is larger than the interval P1 between each first prism 43. In addition, a design is made such that the width Q2 of each second prism 44 is larger than the width Q1 of each first prism 43. With such a configuration, the positional relationship between each first prism 43 and each second prism 44 can be adjusted such that at the screen center, each first prism 43 and each second prism 44 are located complementarily; and at the screen edge, each first prism 43 and each second prism 44 partially overlap each other.

For example, it is assumed that the viewer views the image display apparatus 10 at a position in front of the screen center. When light is converged on the viewer in front of the screen center, it is necessary to transmit the light in a direction parallel to the Z axis direction near the screen center of the liquid crystal prism element 40, as indicated by an arrow in FIG. 3A. Thus, the first prisms 43 and the second prisms 44 are arranged so as to not overlap each other when being viewed from the Z axis direction. Meanwhile, at the screen right edge, it is necessary to transmit the light in a direction inclined at a predetermined angle with respect to the Z axis, as indicated by an arrow in FIG. 3B. Thus, the first prisms 43 and the second prisms 44 are arranged so as to not overlap each other when being viewed from the direction inclined at the predetermined angle with respect to the Z axis.

In order to realize such a configuration, a design is made such that the interval P2 between each second prism 44 is larger than the interval P1 between each first prism 43.

With the configuration described above, near the screen center, the second prisms 44 are arranged between the adjacent first prisms 43 as shown in FIG. 3A when being viewed from the Z axis direction. In addition, the first prisms 43 are arranged between the adjacent second prisms 44. In other words, near the screen center, the first prisms 43 and the second prisms 44 are arranged so as to not substantially overlap each other when being viewed from the Z axis direction.

Meanwhile, in the region at the screen right edge, the first prisms 43 and the second prisms 44 are arranged such that portions of the first prisms 43 and portions of the second prisms 44 overlap each other, when being viewed from the Z axis direction. In other words, the first prisms 43 and the second prisms 44 are arranged so as to not overlap each other when being viewed from the direction inclined at the predetermined angle with respect to the Z axis.

Next, the configuration of a liquid crystal prism element according to a comparative example will be described with reference to FIGS. 4A to 4C.

Figure 4A:
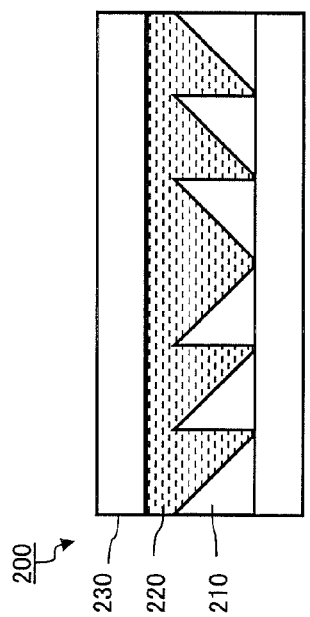
FIG. 4A is a cross-sectional view of a liquid crystal prism element according to a comparative example.

FIG. 4A is a cross-sectional view of the liquid crystal prism element 200 according to the comparative example. FIG. 4B is a schematic diagram showing a refractive index distribution of the liquid crystal prism element 200 shown in FIG. 4A. FIG. 4C is a diagram schematically showing a refractive index distribution near a recess in the liquid crystal prism element shown in FIG. 4A. Each of a plurality of curves within the liquid crystal prism element 200 shown in FIG. 4B is a curve obtained by connecting points at which refractive indexes are the same. In addition, the value of the refractive index at the position of each curve is shown on the right side of FIG. 4B.

As shown in FIG. 4A, the conventional liquid crystal prism element 200 includes a plurality of prisms 210 and a liquid crystal layer 220. The plurality of prisms 210 are aligned in the X axis direction without intervals therebetween.

When a voltage is applied to the liquid crystal prism element 200, the orientation of liquid crystal molecules of the liquid crystal layer 220 changes as shown. Near an inclined surface 81 and a wall surface 82 of each prism 210, due to anchoring, the orientation of the liquid crystal molecules does not change. Thus, the refractive index is different between a region near the inclined surface 81 and the wall surface 82 and a region on the inner side of this region. As a result, a refractive index distribution occurs as shown in FIG. 4B. Particularly, near a recess formed by the inclined surface 81 and the wall surface 82 (an "M" portion surrounded by a solid line in FIG. 4B), a curved surface-shaped refractive index distribution occurs. As shown in FIG. 4C, a concave curved surface is formed between the region where the refractive index is high and the region where the refractive index is low. Thus, this region serves as a concave lens. Therefore, light incident on this region is diffused by the action of the concave lens. Such a phenomenon occurs in the entire liquid crystal prism element 200, and thus light transmitted through the liquid crystal prism element 200 loses its directivity and is scattered. As a result, the amount of light incident on both eyes of the user is reduced.

Thus, the liquid crystal prism element 40 according to the present embodiment are configured as shown in FIGS. 3A and 3B.

Figure 5:
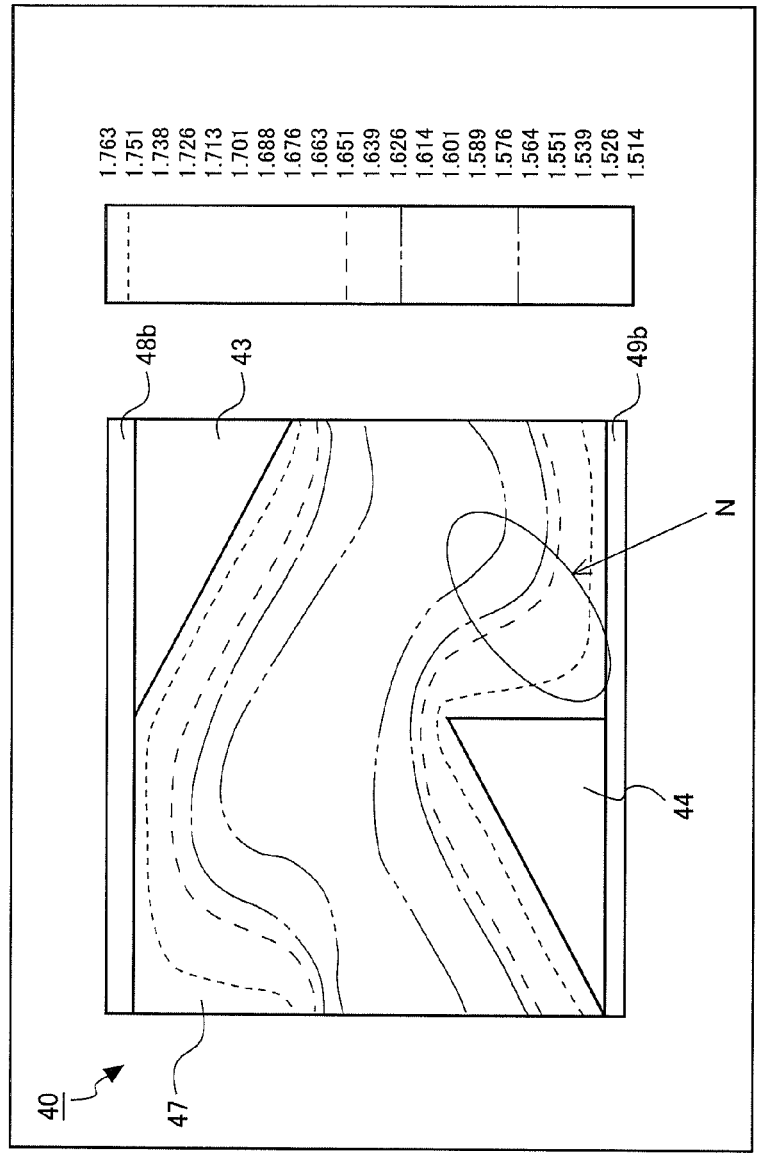
FIG. 5 is a schematic diagram showing a refractive index distribution of the liquid crystal prism element according to the embodiment.

FIG. 5 shows a change of the refractive index distribution of the liquid crystal prism element 40 according to the present embodiment. Each of a plurality of curves within the liquid crystal layer 47 shown in FIG. 5 is a curve obtained by connecting points at which refractive indexes are the same. In addition, the value of the refractive index at the position of each curve is shown on the right side of FIG. 5. In the present embodiment, the first prisms 43 are arranged so as to be spaced apart from each other at predetermined intervals. Thus, unlike the conventional art, no recess formed by the inclined surface 81 and the wall surface 82 and having a small included angle is provided.

Figure 4B:
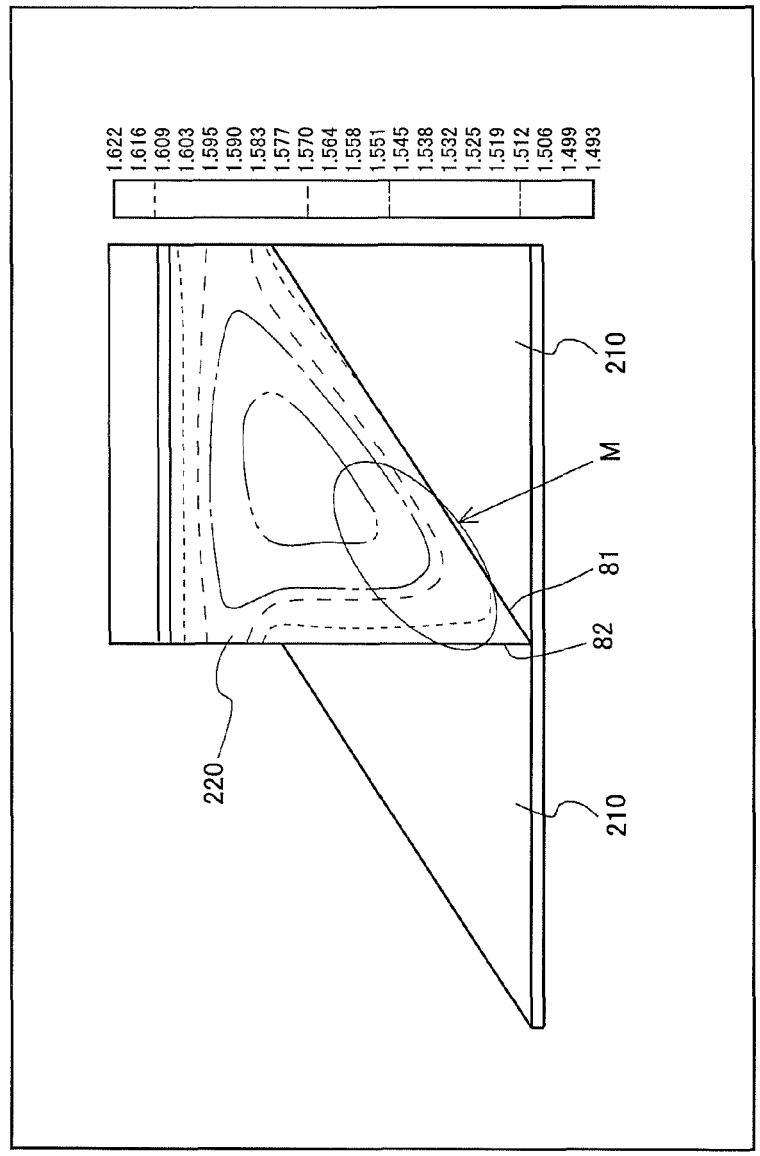
FIG. 4B is a schematic diagram showing a refractive index distribution of the liquid crystal prism element according to the comparative example.
Figure 4C:
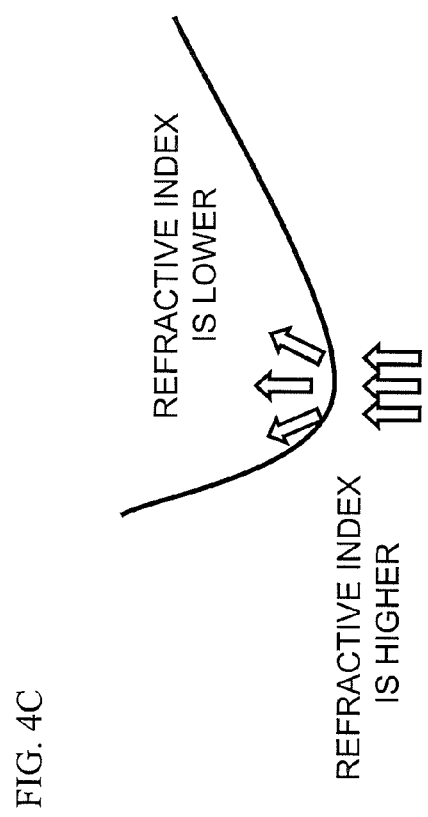
FIG. 4C is a diagram schematically showing a refractive index distribution near a recess in the liquid crystal prism element according to the comparative example.

As a result, in an "N" portion surrounded by a solid line in FIG. 5, each curve obtained by connecting the points at which the refractive indexes are the same is gentler than in the "M" portion surrounded by the solid line in FIG. 4B, and change in refractive index in a curved manner as in the conventional art is suppressed. Therefore, the liquid crystal prism element 40 is able to reduce scattering of light at the liquid crystal layer 47. Since scattering of light at the liquid crystal layer 47 is reduced, light transmitted through the liquid crystal prism element 40 reaches the eyes of the viewer while having directivity. As a result, reduction of the amount of light incident on both eyes of the use is suppressed.

Conclusion

As described above, the liquid crystal prism element 40 according to the present embodiment includes the first prism array 45, the second prism array 46, and the liquid crystal layer 47.

The second prism array 46 is arranged so as to face the first prism array 45.

The liquid crystal layer 47 is provided between the first prism array 45 and the second prism array 46.

The first prism array 45 is composed of a plurality of the first prisms 43 that have ridge lines extending in the Y axis direction (an example of the first direction) and are arranged so as to be spaced apart from each other at predetermined intervals in the X axis direction (an example of the second direction).

The second prism array 46 is composed of a plurality of the second prisms 44 that have ridge lines extending in the Y axis direction (an example of the first direction) and are arranged so as to be spaced apart from each other at predetermined intervals in the X axis direction (an example of the second direction).

Each of the first prisms 43 has the inclined surface 81 (an example of the first inclined surface) facing the center side of the liquid crystal layer 47.

Each of the second prisms 44 has the inclined surface 84 (an example of the second inclined surface) facing the center side of the liquid crystal layer 47.

With such a configuration, the refractive index distribution of the liquid crystal layer 47 can be controlled more appropriately than in the conventional art. As a result, reduction of the brightness of the display surface can be suppressed as compared to the conventional art.

Other Embodiments

In the present embodiment, the light guide plate is shared by the light sources 21a and 21b. However, a light guide plate for the light source 21a and a light guide plate for the light source 21b may be provided so as to be laminated on each other.

In addition, instead of the light control film 30 in which the prisms and the lenticular lens are integrated, a prism sheet and a lenticular lens sheet may be individually provided.

Furthermore, the light source switching type backlight 20 is not limited to have the configuration shown in FIGS. 1 and 2, and may have another configuration as long as it is able to alternately emit light for right eye and light for left eye in a time division manner in synchronization with switching between right and left image signals.

Furthermore, in the present embodiment, the directions of the inclined surfaces of the first prisms 43 in the liquid crystal prism element 40 are made different between the regions R1 and R2, and the inclined surfaces of the first prisms 43 are formed so as to be symmetrical about the plane P1. However, the directions of the inclined surfaces of the prisms may be uniform in the entire liquid crystal prism element 40. In this case, instead of providing the separate electrodes in the regions R1 and R2 of the liquid crystal prism element 40 as in the present embodiment, a single electrode is provided over the entire display screen. However, it is more preferred to provide the first prisms 43 and the electrodes separately in the two regions R1 and R2, in terms of the deflection angle and transmission efficiency of a light beam with respect to orientation change.

Furthermore, the present embodiment has been described with, as an example, a stereoscopic image display apparatus that displays, in a time division manner, an image for right eye and an image for left eye that have a parallax. However, an image having no parallax may be displayed. In this case, the light sources 21a and 21b are constantly lit up instead of being alternately lit up. In addition to the case of displaying a three-dimensional image, also when a two-dimensional image is displayed, the displayed content can be prevented from being seen by surrounding people and privacy protection can also be improved, by following movement of the viewer and projecting an image only on the eyes of the viewer and the vicinity thereof in a reduced range.

The present disclosure is applicable to an image display apparatus displaying a stereoscopic image, and the like. Specifically, the present disclosure is applicable to display surfaces of a television, a personal computer, and a digital still camera, a display surface of a video camera, a display surface of a camera-equipped cellular phone, a display surface of a smart phone, a display surface of a tablet computer, and the like.

As presented above, the embodiments have been described as examples of the technology according to the present disclosure. For this purpose, the accompanying drawings and the detailed description are provided.

Therefore, components in the accompanying drawings and the detail description may include not only components essential for solving problems, but also components that are provided to illustrate the above described technology and are not essential for solving problems. Therefore, such inessential components should not be readily construed as being essential based on the fact that such inessential components are shown in the accompanying drawings or mentioned in the detailed description.

Further, the above described embodiment has been described to exemplify the technology according to the present disclosure, and therefore, various modifications, replacements, additions, and omissions may be made within the scope of the claims and the scope of the equivalents thereof.

What is claimed is:

1. A liquid crystal optical element comprising:
    a first prism array;
    a second prism array arranged so as to face the first prism array; and
    a liquid crystal layer provided between the first and second prism arrays, wherein
    the first prism array is composed of a plurality of first prisms that have ridge lines extending in a first direction and are arranged so as to be spaced apart from each other at predetermined intervals in a second direction perpendicular to the first direction,
    the second prism array is composed of a plurality of second prisms that have ridge lines extending in the first direction and are arranged so as to be spaced apart from each other at predetermined intervals in the second direction,
    each of the first prisms has a first inclined outer surface facing a center plane that is perpendicular to the second direction and passes through a center line of the liquid crystal optical element, and
    each of the second prisms has a second inclined outer surface facing the center plane.

2. The liquid crystal optical element according to claim 1, wherein the second prisms are configured so as to be arranged between the adjacent first prisms at least in a portion of a region, when being viewed from a third direction perpendicular to the first direction and the second direction.

3. An image display apparatus comprising the liquid crystal optical element according to claim 1.

* * * * *